June 10, 1969     J. R. BOTTERILL ETAL     3,449,017
BRAKE SYSTEM
Filed Sept. 22, 1967
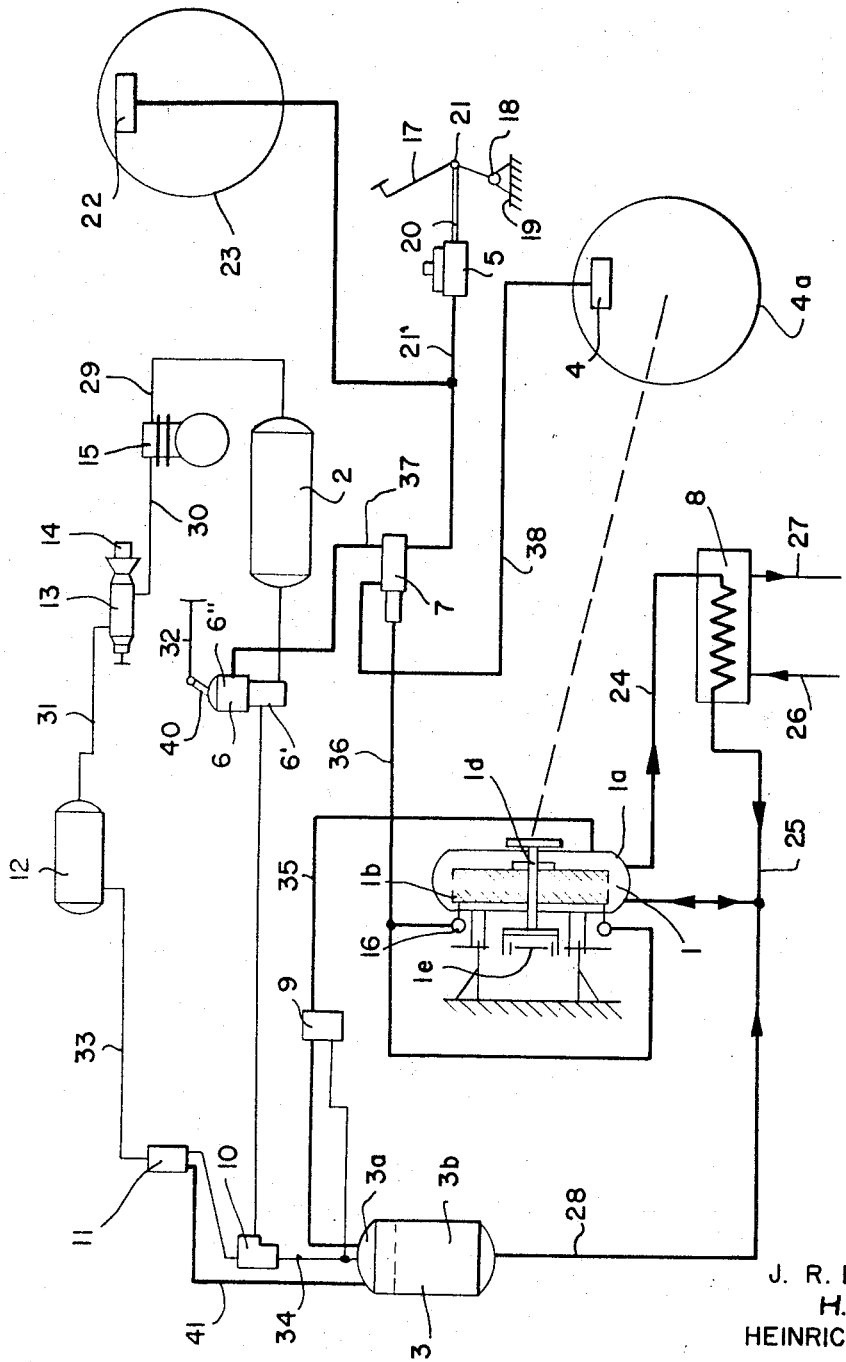
J. R. BOTTERILL
H. C. KLEIN
HEINRICH OBERTHUR
      INVENTOR.
*Karl G. Ross*
ATTORNEY

United States Patent Office 3,449,017
Patented June 10, 1969

3,449,017
BRAKE SYSTEM
John R. Botterill, Warwickshire, England, and Hans-Christof Klein, Hattersheim, and Heinrich Oberthur, Offenbach-Rumpenheim, Germany, assignors to Alfred Teves Maschinen-und Armaturenfabrik KG., Frankfurt am Main, Germany, a corporation of Germany
Filed Sept. 22, 1967, Ser. No. 669,941
Claims priority, application Germany, Sept. 24, 1966, T 32,131
Int. Cl. B60t 8/02, 9/02
U.S. Cl. 303—2             12 Claims

ABSTRACT OF THE DISCLOSURE

A vehicle-brake installation having a hydrodynamic brake and a friction brake pressurizable with hydraulic fluid by a master cylinder to brake a common wheel, a pressure-retentive charging vessel containing hydraulic fluid and communciating with the hydrodynamic brake, and a suction side and a pressure side of a compressor connected to the charging vessel by valves selectively applying gas pressure to the vessel or subjecting it to suction.

---

Our present invention relates to a brake system including a hydrodynamic brake and, more particularly, to a brake installation for an automotive vehicle having a fluid-operated mechanical-friction brake and a hydrodynamic brake cooperating to brake rotation of a vehicle axle.

It has already been proposed to provide hydrodynamic brake systems for restricting rotation of a shaft relative to a brake-support member. In such arrangements, the hydrodynamic brake generally consists of a first toroidal or cylindrical shell half connected with the shaft and a confronting similar shell half mounted upon the support and defining an annular chamber or a plurality of segmental chambers with the rotary shell member. A hydraulic fluid in this chamber is pumped around by the vanes of the rotating and stator members and, in accordance with the pumping characteristics, the pressure of the fluid within the chamber, etc. creates more or less liquid friction to impede the shaft rotation. One such device of this general character is set forth in the commonly assigned Patents Nos. 3,265,162 of Aug. 9, 1966 and 3,302,-755 of Feb. 7, 1967. In the latter system, the vehicle-brake system includes a hydraulic decelerator or hydrokinetic brake coupled with the shaft and having a rotary (rotor) member mounted thereon and a relatively stationary (stator) member connected with the vehicle chassis for reducing the rotary speed of the shaft upon the delivery of hydraulic fluid under pressure to the decelerator. To permit the shaft to be brought to standstill, an operation which cannot be effectively carried out merely by control of the fluid pressure in the hydraulic-decelerator chambers, there is provided fluid-responsive friction-brake means in the decelerator energizable with fluid under pressure for frictionally interconnecting the relatively rotatable decelerator members. The brake-operating means there comprises the normal master cylinder which supplies fluid under pressure to both the friction-brake means and a hydraulic decelerator or hydrodynamic brake. As pointed out in these patents, the system may include differential-valve means in the fluid line and decelerator-energizing means while control means is responsive to the degree of hydraulic braking by the decelerator to operate the differential valve means to maintain the total braking force applied to the vehicle by the hydraulic decelerator and the friction brake means substantially constant for all shaft speeds. Other hydrodynamic brakes are described in U.S. Patent Nos. 1,297,225 and 2,241,189.

Thus is can be stated that the art recognizes the value of making use of a friction brake in which mechanical braking force is supplied together with hydrodynamic brake force to a common shaft. Such an arrangement is especially valuable on long brake processes in which the frictionally developed heat of the mechanical brake cannot be dissipated with efficiency. Furthermore, hydrodynamic brake efficiency falls off shortly with diminution of the relative speeds of the two members of the hydrodynamic brake and a uniform breaking effectiveness cannot be maintained when the hydrodynamic brake alone is used.

Yet a further disadvantage of prior hydrodynamic brake systems is that even during the energized periods, the hydrodynamic brake is engaged in pumping the hydraulic fluid around within the chambers in an essentially ineffective manner which, however, produces wear of the various parts, decreased stability of the hydraulic fluid and usually decreased efficiency since the heat of this fluid movement is not dissipated.

It is, therefore, the principal object of the present invention to provide an improved brake arrangement using hydrodynamic brake means in conjunction with fluid-operated mechanical-friction brake means and in which the brake torque or force moment remains constant at substantially all speeds of the shaft, the hydrodynamic-fluid loss is minimized and the effects of pumping during idle operation of the hydrodynamic brake are obviated.

These objects and other which will become apparent hereinafter are attained, in accordance with the present invention, by providing the hydrodynamic brake with a fluid-pressure responsive accumulator selectively energizable by elevated fluid pressure for normal brake operation and being de-energizable for the idle operation of the system, the switchover being effected by means of a control valve communicating with the brake master cylinder. In general, we prefer to provide a further valve system, hereinafter referred to as a reversing valve, between the control valve and the accumulator cylinder. Thus the hydrodynamic brake can be rendered independent from the actuation system of the friction brake and can be operated independently of the other. This is of advantage during prolonged periods of travel in hilly or mountainous terrain where the control valve can be triggered independently of the brake pedal, e.g. by hand.

The above and other objectives, features and advantages of the present invention will become more readily apparent from the following description, reference being made to the accompanying drawing in which the sole figure is a flow diagram of a hydraulic installation embodying the present invention.

In the drawing, we show a hydrodynamic and mechanical-friction brake system actuated by an air-hydraulic network many of whose components may be of the type described in "Principles of Automotive Vehicles," Department of the Army Technical Manual TM 9–8000, pages 449ff., U.S. Government Printing Office, Washington, D.C., 1956, and reference, with respect to the structure of the compressor, the valves, the master cylinder and the friction brake, may be made to this publication for elucidation. The hydrodynamic brake may be of the type described in U.S. Patent No. 1,297,225 or U.S. Patent No. 2,241,189.

The brake system essentially comprises a hydrodynamic brake 1 whose housing 1a contains a first axially concave, generally toroidal vaned member 1b which is affixed to a nonrotatable part of the vehicle and confronts an oppositely concave vaned toroidal member 1c coupled with the shaft 1d of the vehicle while represented diagrammatically at 4a as being associated with a wheel brake cylinder 4. The shaft 1d is driven by the differential 1e in the power train. During normal brake operation, the brake pedal 17, which is fulcrumed at 18 to the vehicle chassis 19, is depressed to drive the piston rod 20 (articulated to the brake pedal lever at 21′) to the left and shift the piston within the master cylinder 5 to force hydraulic fluid through the conduit 21. The line 21 supplies a wheel-brake cylinder 22 whose wheel 23 and axle are not associated with any hydrodynamic brake whatever so that normal brake operation occurs at this wheel. The rotation of members 1b and 1c of the hydrodynamic brake circulates hydraulic fluid through the lines 24 and 25 of a cooling circuit including the coil of a heat exchanger 8. The cooling fluid is supplied to the latter and removed via lines 26 and 27, the cooling circulation being carried out in the manner described in any of the aforementioned patents. A pressure accumulator and hydraulic reservoir 3 which is supplied at its upper end with air under pressure and drives hydraulic fluid downwardly through line 28 serves to pressurize the hydrodynamic brake 1 to render it effective.

A compressor 15, driven by the engine or a separate electric motor, has its discharge or elevated-pressure port connected via a line 29 to a pressure accumulator 2, here constituted as a compressed-air storage tank. This tank thus constitutes (with the discharge port of compressor 15) the source of elevated gas pressure. The suction of intake port of the compressor 15, at which the subatmospheric or reduced pressure is generated, communicates via line 30 with an automatic suction-bypass valve 13 having an intake 14 provided with an air filter. This valve, convention in suction systems in which both the pressure and suction sides of the compressor are used, communicates via line 31 with a suction accumulator 12 in the form of an air tank which is partly evacuated by the compressor 15. The tank 12 thus constitutes, with the suction port of compressor 15, the suction source of the present invention.

As previously described, the suction source 12–15 and the pressure source 2, 15 are connected with the fluid-storage and pressure-charging vessel 3 by valve means controllable from the brake pedal 17 and a handle 32 whose function will be described in greater detail hereinafter. To this end, the suction tank 12 is linked by an oil separator 11 and a gas line 33 with a reversing valve 10 (see application Ser. No. 668,462 filed Sept. 18, 1967 by Heinrich Oberthür) whose other side communicates via line 34 with the gas compartment 3a of the vessel 3. The oil separator 11, in which particles of oil entrained in the gases passing through the separator are accumulated and discharged or returned to the oil cycle (e.g. the oil compartment 3b of vessel 3), is conventional and may consist of an expansion chamber for precipitating the oil in the form of droplets, a small-gauge screen or an air-oil filter adapted to mechanically trap the oil particles. The gas chamber 3a of vessel 3 communicates also with a pressure-equalizing valve 9 which, in turn, communicates with the hydrodynamic brake 1 via a line 35. A return tube 41, which may have suitable checkvalves, carries collected hydraulic fluid back to the vessel 3.

As described in Patent No. 3,265,162, a feedback arrangement is provided between the hydraulic decelerator and the control means to ensure that the brake force applied to the shaft remains constant. The feedback means here comprises a servofollower represented at 16 (e.g. of the type described in this last-mentioned patent) which communicates with the master cylinder via hydraulic line 36 to deliver a control pulse to the servofollower valve 7 connected between the line 21 from the master cylinder 5 and the lines 37 and 38 delivering the brake fluid respectively to the control valve 6 and the wheel brake cylinder 4. The control valve 6, whose valve member is received in the valve body 6′ and regulates the flow of compressed air from the tank 2 through the line 39 to switchover valve 10, has a fluid-operated cylinder 6″ with which line 37 communicates to shift the valve member. This mechanically and hydraulically operable valve also is provided with a control lever 40 to which manually actuatable arm 32 is connected for operation of the control valve 6 even when the pedal is not depressed.

When the vehicle is traveling at a more or less constant speed with the brake system in a deactuated steady-state arrangement and no braking is required, the compressor 15 draws air through the valve 13 from the suction tank 12 while forcing air into the compressed-air tank 2. The reduced pressure is applied by the tank 12 via line 33 and oil separator 11, to the switchover valve 10 and transmitted via line 34 to the gas chamber 3a overlying the liquid level within the vessel 3. Since the charging vessel 3 is here under reduced pressure, the hydraulic fluid is drawn inwardly from line 28 at the hydrodynamic brake 1 which is relatively ineffective and pumps little, if any, oil. As soon as the vacuum in tank 12 and the gas space 3a reaches a predetermined absolute value, i.e. when the pressure falls in tank 12 to a predetermined level, the vacuum-release valve 13 shifts to block line 31 and communicate between the intake 14 and the suction port of compressor 15 thereby allowing the continuous operation of the latter. Air is pumped into the pressure tank 2 during this period from the atmosphere and communication between tank 12 and compressor 15 is only restored when the absolute pressure in tank 12 increases to a level sufficient to trip the valve 13, block the intake 14 and connect compressor 15 with tank 12.

When the vehicle is engaged in normal road operation and no brake action is required, the pedal 17 is not depressed and no hydraulic fluid is forced from the master cylinder 5 through the line 21 to either of the wheel-brake cylinders 4 and 21 or to the servo-control valve 7. The reduced pressure in compartment 3a of the vessel 3 precludes any pumping action in the hydrodynamic brake 1. As soon as a requirement exists for braking of the vehicle, the operator presses upon pedal 17 to shift the piston of master cylinder 5 to the left and thereby forces hydraulic fluid to the servo-control valve 7. At the same time, brake fluid is supplied to the front wheel-brake cylinder 22 directly and initial braking action is commenced. The rear wheel-brake cylinder 4 is actuated via the servovalve 7 simultaneously with the delivery of hydraulic fluid via line 37 to the dual control valve 6 which is thus hydraulically biased to form a path between the air-pressure tank 2 and the reversing valve 10. The latter is thus actuated to block communication between the vacuum tank 12 and the vessel 3 while air is delivered under pressure to the gas compartment 3a overlying the liquid level within the charging vessel. The gas-pressurized hydraulic fluid is forced via line 28 into the hydrodynamic brake 1 which is thus rendered effective so that hydraulic fluid is pumped by the relatively rotating members of the hydrodynamic brake through the closed path 24, 25 which includes a heat exchanger 8 from which the dynamically developed heat of the hydraulic fluid is dissipated by the circulation of the cooling fluid through the heat exchanger.

The pre-control or equalizing valve 9 is provided between the outlet side of the reversing valve 10, the charging vessel 3 and the hydrodynamic brake 1 to ensure pressure equality between them. When the hydrodynamic brake 1 is rendered effective, the stationary toroidal member 1b, here forming a so-called stator, receives a reaction for which is proportional to the brake effectiveness and is transferred to the servodetector 16 which applies a control movement to the valve member of the servovalve 7 (see U.S. Patent No. 3,265,162). This operation of the servovalve 7 varies the hydraulic pressure applied by line 37 to the control valve 6 and, via line 38, to the wheel-brake cylinder 34 such that the sum of the brake moments of the hydrodynamic brake and the mechanical-friction brake corresponds, regardless of the rate of rotation of the shaft 1d, to the predetermined value associated with the extent to which the brake pedal 17 has been depressed and the corresponding braking effectiveness of a mechanical-friction brake in the absence of any hydrodynamic brake. Thus, at relatively slow speeds, i.e. when the hydrodynamic brake effectiveness is minimal, the equalizing servovalve 7 permits the full brake force determined by the position of the master cylinder 5 to be applied to the wheel-brake cylinder 4, thereby bringing the vehicle to standstill. When the vehicle operates at elevated speeds and the hydrodynamic brake is most effective, a brake-actuating depression of the pedal 17 will give rise to an increased pressure in the hydrodynamic brake 1 and practically no increase in pressure in the wheel-brake cylinder 4.

During operating modes in which no total braking is desired, e.g. for relatively long periods of downhill travel in which a constant vehicle speed is maintained by braking the forward motion, the present system permits brake operation without the wear of the friction brake which has hitherto characterized earlier brake systems. In this case, the control valve 6 is manually actuated at 32 to connect the pressure tank 2 with the reversing valve 10, thereby pressurizing the hydrodynamic brake 1 without applying hydraulic pressure to the wheel-brake cylinder 4.

At the instant the operator removes his foot from the pedal 17 of the master cylinder 5 or releases the handbrake actuator 32 and further braking is unnecessary, the reversing valve 10 closes the communication between vessel 3 and the compressed-air tank 2 while reopening communication between suction tank 12 and the vessel 3 to place the vessel 3 under negative i.e. subatmospheric pressure. The hydraulic fluid in the vessel is not only depressurized but is also withdrawn so that any pumping of the fluid within the ineffective hydrodynamic tank decreases to a negligible value. The oil separator 11 acts in part as a check valve which prevents any sudden surge of hydraulic fluid, resulting from switchover of valve 10, from carrying liquid into tank 12.

We claim:

1. In a brake installation for a rotary member, comprising a hydrodynamic brake pressurizable with hydraulic fluid to control the braking effectiveness thereof, a mechanical-friction brake actuatable by hydraulic fluid acting upon said rotary member, and actuating means for operating said brakes including a master cylinder for displacement of a hydraulic fluid, the improvement which comprises, in combination:
   (a) a pressure-retentive charging vessel containing hydraulic fluid and communicating with said hydrodynamic brake;
   (b) a suction source connectable with said charging vessel for applying a subatmospheric reduced gas pressure thereto to withdraw hydraulic fluid into said vessel;
   (c) a pressure source connectable with said charging vessel for applying gas pressure thereto to urge hydraulic fluid from said vessel into said hydrodynamic brake; and
   (d) fluid-pressure-responsive valve means connected between said sources on said vessel for maintaining the collective braking effects of said mechanical-friction brake and said hydrodynamic brake substantially constant during a braking process and operable by said master cylinder selectively to pressurize said vessel upon actuation of said master cylinder and to apply subatmospheric reduced gas pressure to said vessel upon deactivation of said master cylinder.

2. In a brake installation for a rotary member, comprising a hydrodynamic brake pressurizable with hydraulic fluid to control the braking effectiveness thereof, a mechanical-friction brake actuatable by hydraulic fluid acting upon said rotary member, and actuating means for operating said brakes including a master cylinder for displacement of a hydraulic fluid, the improvement which comprises, in combination:
   (a) a pressure-retentive charging vessel containing hydraulic fluid and communicating with said hydrodynamic brake;
   (b) a suction source connectable with said charging vessel for applying a reduced gas pressure thereto to withdraw hydraulic fluid into said vessel;
   (c) a pressure source connectable with said charging vessel for applying gas pressure thereto to urge hydraulic fluid from said vessel into said hydrodynamic brake;
   (d) fluid-pressure-responsive valve means connected between said sources and said vessel and operable by said master cylinder selectively to pressurize said vessel upon actuation of said master cylinder and to apply reduced gas pressure to said vessel upon deactivation of said master cylinder, said fluid-pressure-responsive valve means including a reversing valve connectable between said sources and said vessel for selectively and alternatively connecting said sources to said vessel, and a control valve hydraulically actuatable by said master cylinder, said control valve being connected with said reversing valve for operating same; and
   (e) servo-control valve means connected between said master cylinder and said mechanical-friction brake for establishing the relative effectiveness of said brake, and operatively connected with said hydrodynamic brake and coupled with said servo-control valve means for operating same in dependence upon the braking effectiveness of said hydrodynamic brake.

3. In a brake installation for a rotary member, comprising a hydrodynamic brake pressurizable with hydraulic fluid to control the braking effectiveness thereof, a mechanical-friction brake actuatable by hydraulic fluid acting upon said rotary member, and actuating means for operating said brakes including a master cylinder for displacement of a hydraulic fluid, the improvement which comprises, in combination:
   (a) a pressure-retentive charging vessel containing hydraulic fluid and communicating with said hydrodynamic brake;
   (b) a suction source connectable with said charging vessel for applying a reduced gas pressure thereto to withdraw hydraulic fluid into said vessel;
   (c) a pressure source connectable with said charging vessel for applying gas pressure thereto to urge hydraulic fluid from said vessel into said hydrodynamic brake; and
   (d) fluid-pressure-responsive valve means connected between said sources and said vessel and operable by said master cylinder selectively to pressurize said vessel upon actuation of said master cylinder and to apply reduced gas pressure to said vessel upon deactivation of said master cylinder, said fluid-pressure-responsive valve means including a reversing valve connectable between said sources and said vessel for selectively and alternatively connecting said sources to said vessel, and a control valve hydraulically actuatable by said master cylinder, said control valve being connected with said reversing valve for operating same, said suction source including an intake port of an air compressor and said pressure source including a discharge port of said compressor.

4. The improvement defined in claim 3, further comprising a reduced-pressure reservoir connected between said intake port and said reversing valve, and a pressure reservoir connected between said discharge port and said reversing valve.

5. The improvement defined in claim 4, further comprising a suction-bypass valve connected to said intake port ahead of said reduced-pressure reservoir for connecting said intake port with the atmosphere upon the pressure in said reduced-pressure reservoir attaining a predetermined minimum value and connecting said intake port with said reduced-pressure reservoir upon the pressure in said reduced-pressure reservoir exceeding said value.

6. The improvement defined in claim 4 wherein said control valve is connected between said pressure reservoir and said reversing valve.

7. The improvement defined in claim 4, further comprising liquid/gas separating means connected between said reversing valve and said reduced-pressure reservoir for preventing the passage of hydraulic fluid from said vessel into said reduced-pressure reservoir.

8. The improvement defined in claim 7, further comprising a return line communicating between said separating means and said vessel for returning accumulated hydraulic fluid to the latter.

9. In a brake installation for a rotary member, comprising a hydrodynamic brake pressurizable with hydraulic fluid to control the braking effectiveness thereof, a mechanical-friction brake actuatable by hydraulic fluid acting upon said rotary member, and actuating means for operating said brakes including a master cylinder for displacement of a hydraulic fluid, the improvement which comprises, in combination:
  (a) a pressure-retentive charging vessel containing hydraulic fluid and communicating with said hydrodynamic brake;
  (b) a suction source connectable with said charging vessel for applying a reduced gas pressure thereto to withdraw hydraulic fluid into said vessel;
  (c) a pressure source connectable with said charging vessel for applying gas pressure thereto to urge hydraulic fluid from said vessel into said hydrodynamic brake;
  (d) fluid-pressure-responsive valve means connected between said sources and said vessel and operable by said master cylinder selectively to pressurize said vessel upon actuation of said master cylinder and to apply reduced gas pressure to said vessel upon deactivation of said master cylinder;
  (e) means connected with said hydrodynamic brake for circulating the hydraulic fluid thereof along a closed path when said hydrodynamic brake is effective; and
  (f) heat-exchanger means along said path for cooling the hydraulic fluid circulated therealong.

10. The improvement defined in claim 9 wherein said fluid-pressure-responsive valve means comprises a reversing valve connectable between said sources and said vessel for selectively and alternatively connecting said sources to said vessel.

11. The improvement defined in claim 10 wherein said fluid-responsive valve means further comprises a control valve hydraulically actuatable by said master cylinder, said control valve being connected with said reversing valve for operating same.

12. The improvement defined in claim 11 further comprising mechanical operating means manually actuatable for operating said control valve independently of said master cylinder.

References Cited
UNITED STATES PATENTS

| | | | |
|---|---|---|---|
| 2,402,115 | 6/1946 | Levy. | |
| 2,750,009 | 6/1956 | Pohl | 188—90 |
| 3,265,162 | 8/1966 | Botterill | 188—86 |
| 3,302,755 | 2/1967 | Botterill et al. | 188—86 |

MILTON BUCHLER, *Primary Examiner.*

J. J. McLAUGHLIN, Jr., *Assistant Examiner.*

U.S. Cl. X.R.

60—51; 188—86; 303—6, 10